United States Patent [19]

Bosch

[11] 4,313,030
[45] Jan. 26, 1982

[54] ELECTRICAL PENETRATION APPARATUS AND METHOD OF MAKING SAME

[75] Inventor: Dieter G. Bosch, Simi Valley, Calif.

[73] Assignee: Bunker Ramo Corporation, Oak Brook, Ill.

[21] Appl. No.: 15,853

[22] Filed: Feb. 26, 1979

[51] Int. Cl.³ .................. H01B 17/26; G21C 13/02
[52] U.S. Cl. .................. 174/151; 174/11 R; 264/261
[58] Field of Search .................. 174/11 R, 18, 22 R, 174/23 R, 31 R, 76, 151, 152 R; 339/94 A, 117 P, 218 R, 218 M; 264/261, 262

[56] References Cited

U.S. PATENT DOCUMENTS

| | | | |
|---|---|---|---|
| 3,781,453 | 12/1973 | Funk et al. | 174/151 X |
| 3,909,500 | 9/1975 | Bereza et al. | 174/151 X |
| 4,088,381 | 5/1978 | Harnett | 174/151 X |

Primary Examiner—Laramie E. Askin
Attorney, Agent, or Firm—N. A. Camasto; A. Freilich

[57] ABSTRACT

An electrical penetration apparatus is described for mounting within a containment wall of a nuclear reactor installation to pass electrical currents while avoiding the outward leakage of radioactive gasses, which can be constructed at relatively low cost. The apparatus includes a pair of cup-shaped casings that face away from one another and have slightly separated base walls, a group of rod-shaped conductors extending through aligned holes in the base walls of the casings and through the separation space between them, and a quantity of potting material disposed in each of the casings and sealed to the conductors and to the inside surfaces of the casings.

7 Claims, 7 Drawing Figures

ELECTRICAL PENETRATION APPARATUS AND METHOD OF MAKING SAME

BACKGROUND OF THE INVENTION

Electric penetration assemblies are utilized to pass electric conductors through the containment walls of nuclear reactors. A typical penetration assembly may include a header plate which can receive several penetration modules, each module being installed in a hole of the header plate and secured therein by gas tight seals. One or more electrical conductors pass through each module. In order to assure that there is not outward radiation leakage through the modules, high pressure gas is applied to each of the module-receiving holes and to portions of each electrical conductor contained in the module.

One prior art electrical penetration module utilizes a disk of permeable material such as silicon, commonly referred to as a reticulate, through which the electrical conductors or wires extend. A quantity of epoxy is molded around the reticulate and portions of the wires extend from each face of the reticulate. A radial hole is typically drilled through the epoxy into the reticulate so that pressured gas applied to the outside of the module passes through the hole and permeates the reticulate. Thus, pressured gas is applied around the periphery of the wires and therefore to any leakage paths developing around the wires. This type of prior art module is relatively costly to manufacture, the high cost being primarily attributable to the machining typically required after the epoxy is molded.

SUMMARY OF THE INVENTION

The present invention is directed to an improved electrical penetration module and method of manufacture thereof which can be manufactured at a relatively low cost and which reliably safeguards against the leakage of dangerous materials therethrough.

In accordance with one embodiment of the invention, the penetration module is comprised of a pair of cup-shaped casings, each including a base wall and a side wall. The casings are mounted so as to face away from one another; i.e. open in opposite directions, with their base walls being spaced from one another to form a separation space between the casings. Aligned holes are formed in the base walls for passing one or more electrical conductors therethrough. A quantity of potting material is deposited within the cup-shaped portion of each casing and is sealed to the outside of the conductors and to the walls of the casing.

In accordance with a preferred method of manufacture, the casings are first formed and after the conductors are mounted in the holes of the casing base wall, each casing is utilized as a mold into which the potting compound is cast.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
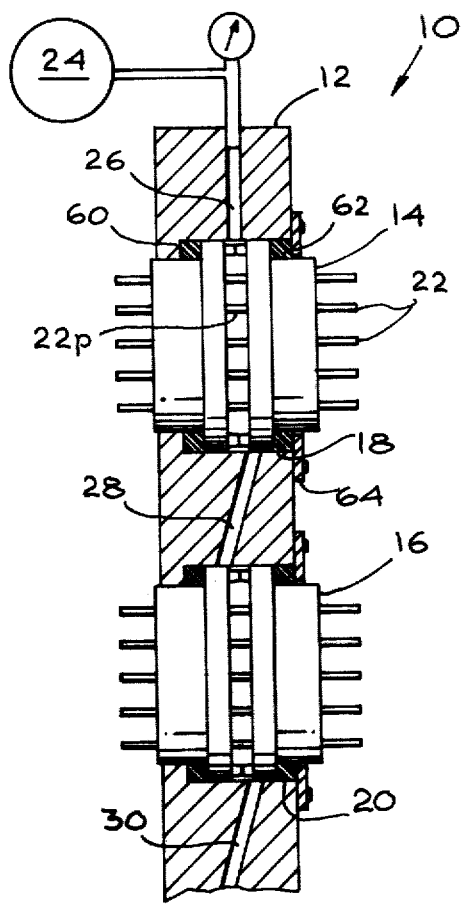
FIG. 1 is a partial sectional view of an electric penetration installation, showing electrical penetration modules of the present invention installed therein.

FIG. 1 illustrates an electric penetration installation 10 which includes a header plate 12 that forms a barrier against the passage of dangerous materials, such as radioactive gases, between the inside and outside of a nuclear reactor installation. A group of electrical penetration modules or apparatuses 14, 16 lie in holes 18, 20 of the header plate, to permit the passage of rod or wire-shaped electrical conductors 22 through the header plate while preventing the passage of radioactive material. The conductors 22 are formed of solid metal which is impermeable to gas, and the major danger of leakage arises from the possibility of leakage of gas around the conductors. To avoid this, portions 22p of each of the conductors are exposed to pressured gas, such as nitrogen, helium or Freon supplied from a pressured gas source 24. The pressured gas source is connected through a passage 26 in the header plate to the exposed portions 22p of the conductors, so that if any cracks or the like develop around the conductors or through the module, the pressured nitrogen will leak into the nuclear reactor and prevent any outleak of radioactive gas. Additional passages 28, 30 connect the gas source to other electrical penetration apparatuses in the header plate.

Figure 2:
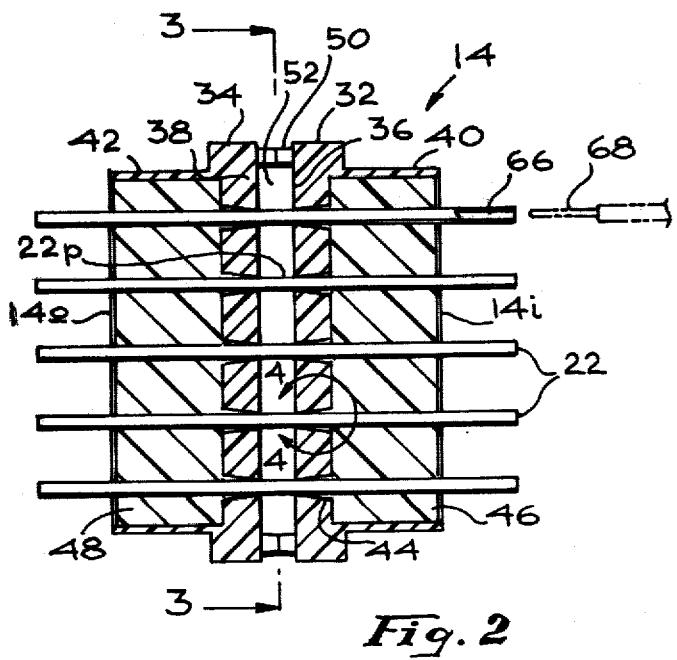
FIG. 2 is a sectional side view of one of the modules of FIG. 1.

Each electrical penetration apparatus or module 14 has the construction shown in FIG. 2. The module 14 includes two identical cup-shaped casings 32, 34 having base walls 36, 38 with surfaces that face one another, and side walls 40, 42 that extend away from one another. Each base wall 36, 38 has several holes 44 aligned with holes in the base wall of the other casing, and the electrical conductors 22 lie in the holes. Quantities 46, 48 of potting material such as epoxy, are disposed at the ends of the casings which lie opposite one another, and within the side walls 40, 42 thereof. Each quantity of potting material is sealed to the outside of the conductors 22 and to the casings 32, 34, to seal the modules against the passage of gas between one end 14i of the module and the other end 14o.

The casings are formed with projections 50 that separate the base walls 36, 38 from one another, to leave a separation space 52 between the casings. The separation space 52 extends around each of the electrical conductors at the portions 22p thereof, and to the periphery of the module, so that pressured gas applied to the periphery of the module is applied to portions of each of the multiple conductors 22. As a result, even if there is a slight separation between one of the conductors 22 and the potting material such as 46 surrounding it, so that gas could leak between the inside 14i and outside 14o of the module in the absence of pressurization, the pressured gas at the conductor portion 22p prevents such leakage. Instead any leakage path would merely permit pressured gas in the space 52 to leak to the inside 14i of the module.

Figure 5:
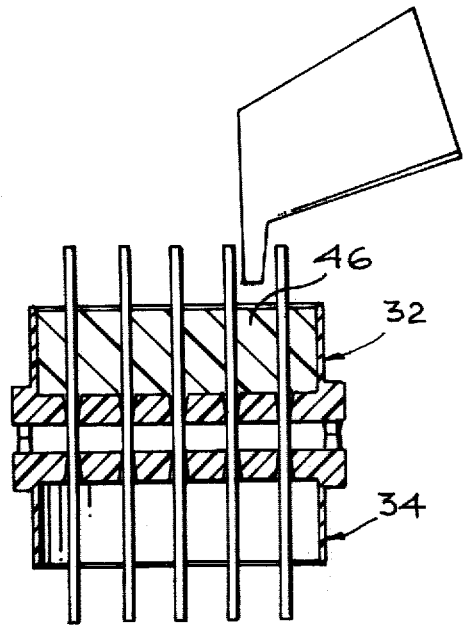
FIG. 5 is a sectional view showing the manner in which the module of FIG. 2 is constructed.

The module 14 can be constructed at relatively low cost by first forming the casings 32, 34 in a mold. In one module which has been constructed, the casings are formed of a fiber filled thermosetting material, and are formed in a transfer molding process, with core pins being utilized to form the desired number of holes 44. After the casings are formed, the conductors 22 can be projected through the holes 44 in the casings. The conductors are preferably chemically cleaned to assure the adhesion of potting material which will be later applied. The projections 50 of the two casings can be aligned to abut one another to provide the separation space 52. The potting material then can be applied in the manner shown in FIG. 5, by pouring the epoxy potting material 46 into one of the casings such as 32 while it faces upwardly. After the epoxy is cast, the module is placed in a vacuum and cured. The module is then turned upside down and the other quantity of molding material 48 is poured into the other casing 34. After again vacuuming and curing the module, it is ready for installation in the header plate.

The module can be installed in the header plate 12 (FIG. 1) by installing an outer seal 60 around one end of the module, installing the module 14 in the header plate hole 18 as shown, applying an inner seal 62 around the module, and installing a retaining plate 64 over the inner seal. Electrical wires can be attached to opposite ends of the penetrator conductors 22, as indicated in FIG. 2, by utilizing recesses 66 in the conductor ends for receiving bared wire ends, and by then crimping the ends of the conductors 22 onto the wires 68. Sometimes, potting of the crimped wire ends is utilized to add reliability.

Figure 4:
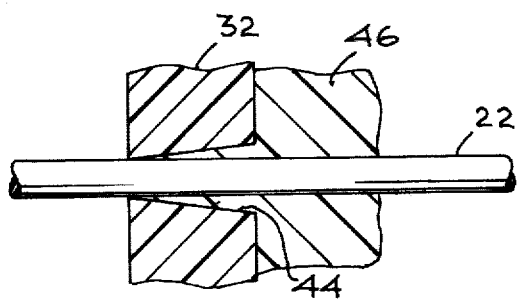
FIG. 4 is an enlarged view of the region 4—4 of FIG. 2.
Figure 3:
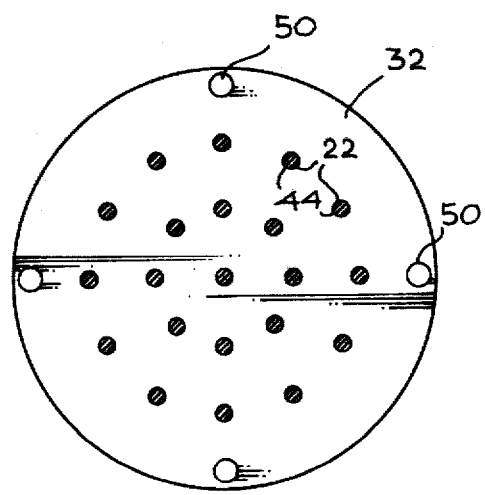
FIG. 3 is a view taken on the line 3—3 of FIG. 2.

As shown in FIG. 4, each of the holes 44 in the casing such as 32 is formed with a taper wherein the large end of the hole faces the rear end of the casing which is opposite the other casing. This tapering permits the establishment of an interference fit between the casing 32 and the conductor 22 to help hold the conductor in position, and also provide an additional area of contact between the casing and the epoxy 46. The two casings 32, 34 can be formed from the same mold, by utilizing a symmetrical arrangement of the holes 44, so that the same pattern of holes is provided when the casing 32 of FIG. 3 is turned upside down.

It has been found that the modules of FIGS. 1-5 can be constructed at relatively low cost, and that a very high proportion of the modules constructed in this way pass the helium leakage test typically applied to such modules. The fact that a separation space 52 is provided around all of the material of the module except for the solid electrical conductors 22, provides high assurance that there is no leakage path for radioactive gas, to which the high pressure source 24 is excluded.

Figure 6:
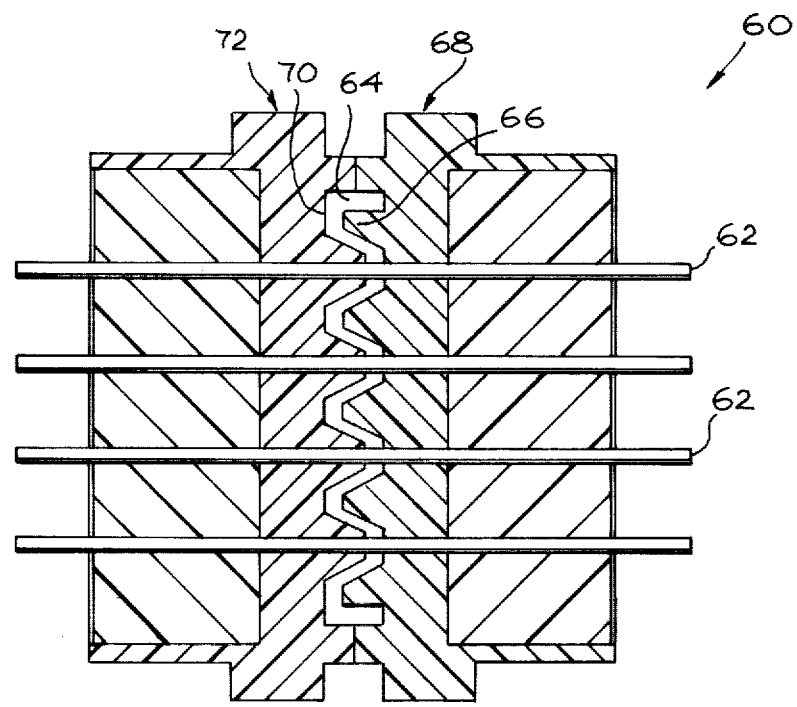
FIG. 6 is a sectional side view of an electrical penetration module constructed in accordance with another embodiment of the invention.

FIG. 6 illustrates another electrical penetration apparatus or module 60 which is similar to that of FIG. 2, except that the module 60 is especially useful for holding conductors 62 that carry high voltages. The empty space 64 (which is filled only with pressured gas) is the area in which arcing can occur between adjacent conductors 62, and the effective separation in this empty space 64 is increased by providing protuberances 66 in the face of one of the casings 68 and corresponding recesses 70 in the face of the other casing 72. This forces any spark between adjacent conductors 62 to pass along a longer path in the gas filled space 64, to provide an effectively larger separation between the conductors. It may be noted that this arrangement utilizes two casings 68, 72 which are mirror images of one another rather than being identical.

Figure 7:
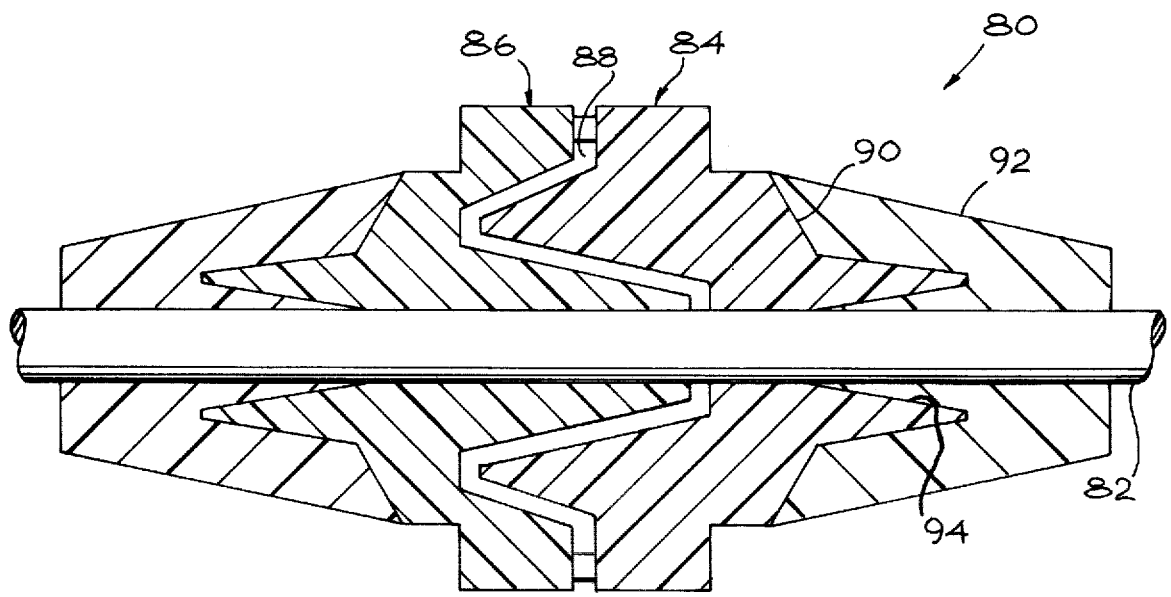
FIG. 7 is a sectional side view of an electrical penetration module constructed in accordance with still another embodiment of the invention.

FIG. 7 illustrates an electrical penetration module apparatus 80 for passing a single conductor 82 that carries a high voltage electrical current. The apparatus includes a pair of casings 84, 86 which form the free space 88 that can be exposed to pressure gas. The casings are not basically cup-shaped, but their rearward ends 90 still serve as a surface against which potting material 92 is formed and held, and the tapered hole 94 in each casing encloses some potting material.

Thus, the invention provides an electrical penetration apparatus which can be constructed at relatively low cost, and which provides for the assured application of pressured gas to all of the electrical conductors that are to be passed through a containment wall by way of the apparatus. This is accomplished by utilizing casings with aligned holes through which the conductors pass, the casings having separated base walls to provide a separation region to which pressured gas can be supplied. In the illustrated modules, the conductors are not directly joined to the material of the casing, but the casings instead serve only to hold the conductors in position and to form at least part of a mold against which potting material can be applied. The potting material seals to the outside of the conductors and to the rearward portion of each casing that lies opposite the other casing, to form a seal around each of the conductors. The casings can be formed with projections which assure separation of their faces. The holes in the casings can be tapered, to facilitate the insertion of the conductors and to provide increased area for the deep reception of the potting material. A pair of identical casings with symmetrical conductor-receiving holes can be utilized in a complete module. For high voltage applications, increased effective separation between conductors can be achieved by forming protuberances and corresponding recesses on the casings.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. An electrical penetration apparatus comprising:
   first and second casings having aligned holes, said casings having surfaces spaced from one another in regions around said aligned holes to form a separation space between said casings, said separation space extending to the periphery of said casings to permit pressured gas applied to the periphery of the casings to flow to the region between said casing surfaces;
   at least one electrical conductor extending through said holes in said casings and through said separation space; and
   two quantities of potting material, each disposed at an end portion of one of said casings which is opposite the other casing, each quantity of potting material sealed to the outside of said conductor and sealed to the corresponding casing;
   said first casing surface forming a protuberance around the conductor-receiving hole therein, and said second surface forming a recess around the conductor-receiving hole therein, said recess receiving said protuberance but the walls forming said recess being spaced from said protuberance.

2. An electrical penetration apparatus comprising:

first and second base walls having aligned holes, said base walls having adjacent surfaces spaced from one another in regions around said aligned holes to form a separation space between said base walls, said separation space extending to the periphery of said base walls to permit pressured gas applied to the periphery of the base walls to flow to the region between said base wall surfaces;

at least one electrical conductor extending through said holes in said base walls and through said separation space; and two quantities of potting material, each disposed at a surface of one of said base walls which is opposite the other base wall, each quantity of potting material sealed to the outside of said conductor and sealed to the corresponding base wall;

said adjacent surface of said first base wall forming a protuberance around the conductor-receiving hole therein, and said adjacent surface of said second base wall forming a recess around the conductor-receiving hole therein, said recess receiving said protuberance but the walls forming said recess being spaced from said protuberance.

3. An electrical penetration apparatus comprising:

first and second base walls having aligned holes, said base walls having surfaces spaced from one another in regions around said aligned holes to form a separation space between said base walls, said separation space extending to the periphery of said base walls to permit pressured gas applied to the periphery of the base walls to flow to the region between said base wall surfaces;

at least one electrical conductor extending through said holes in said base walls and through said separation space; and two quantities of potting material, each disposed at an end portion of one of said base walls which is opposite the other base wall, each quantity of potting material sealed to the outside of said conductor and sealed to the corresponding base wall;

the hole in each base wall being tapered, with the largest end facing the potting material disposed at that base wall, and the quantity of potting material at each base wall including a portion lying in the large end of the base wall hole.

4. The apparatus described in claim 3 wherein:

said conductor is closely surrounded by the walls of said base wall holes but is substantially free of adhesion thereto, and each of said quantities of potting material is tightly adhesively held to a corresponding base wall and tightly holds to said conductor.

5. An electrical penetration apparatus comprising:

first and second casings having base walls with aligned holes, said casings having parallel facing surfaces spaced from one another in regions around said aligned holes to form a separation space between said casings, said separation space extending to the periphery of said casings to permit pressured gas applied to the periphery of the casings to flow to the region between said casing surfaces;

at least one electrical conductor extending through said holes in said casings and through said separation space; and two quantities of potting material, each disposed at an end portion of one of said casings which is opposite the other casing and sealed to the outside of said conductor;

said casings forming at least three projections extending from said facing surfaces to space said surfaces from each other and keep them parallel to one another, whereby to avoid bending of the conductor.

6. An electrical penetration apparatus comprising:

a first cup-shaped casing including a base wall defining a plurality of holes therein extending from a first to a second surface thereof and a sidewall projecting from said first surface of said base wall and surrounding a volume defining a first cavity;

a second cup-shaped casing including a base wall defining a plurality of holes therein extending from a first to a second surface thereof and a sidewall projecting from said first surface of said base wall and surrounding a volume defining a second cavity;

means mounting said first and second casings proximate to one another with their respective base wall second surfaces opposed to but spaced from one another, said mounting means including at least one electrical conductor extending through holes in said first and second casings and through and beyond said first and second cavities;

said first cavity including potting material therein adhered to said at least one electrical conductor and said base wall and side wall of said first casing;

said second cavity including potting material therein adhered to said at least one electrical conductor and said base wall and side wall of said second casing.

7. A method for constructing an electrical penetration module, comprising:

holding a pair of cup-shaped casings which each have at least one hole in its base wall, so their base walls lie opposite one another and their side walls extend away from one another;

projecting an electrical conductor through said holes in said base walls;

holding the casings so the cup opening of a first one faces upwardly, and casting a potting material into the casing; and turning the casings upside down, and casting potting material into the other casing.

* * * * *